(12) United States Patent
Najarian

(10) Patent No.: US 7,095,872 B2
(45) Date of Patent: Aug. 22, 2006

(54) AUTOMATED DIGITAL WATERMARKING METHODS USING NEURAL NETWORKS

(75) Inventor: Kayvan Najarian, Concord, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 311 days.

(21) Appl. No.: 10/134,255

(22) Filed: Apr. 29, 2002

(65) Prior Publication Data
US 2003/0095683 A1 May 22, 2003

Related U.S. Application Data

(60) Provisional application No. 60/315,223, filed on Aug. 28, 2001.

(51) Int. Cl.
*G06K 9/00* (2006.01)
*G06K 9/62* (2006.01)
*G06K 9/36* (2006.01)
*G06K 9/46* (2006.01)

(52) U.S. Cl. .................. 382/100; 382/240; 382/156
(58) Field of Classification Search ............... 382/100, 382/232, 156, 240; 358/3.28; 713/176, 713/180; 380/237; 705/67
See application file for complete search history.

(56) References Cited

U.S. PATENT DOCUMENTS

| | | | |
|---|---|---|---|
| 5,649,070 A | 7/1997 | Connell et al. ............. 382/100 |
| 5,748,763 A | 5/1998 | Rhoads ....................... 382/115 |
| 5,761,665 A | 6/1998 | Gardner et al. ............. 382/100 |
| 5,799,311 A | 8/1998 | Agrawal et al. ............ 707/102 |
| 5,889,868 A | 3/1999 | Moskowitz et al. .......... 380/51 |
| 6,026,193 A | 2/2000 | Rhoads ....................... 382/232 |
| 6,029,195 A | 2/2000 | Herz ........................... 713/176 |
| 6,037,984 A | 3/2000 | Isnardi et al. .......... 375/240.21 |
| 6,101,602 A | 8/2000 | Fridrich ...................... 713/176 |
| 6,104,826 A | 8/2000 | Nakagawa et al. ......... 382/100 |
| 6,157,330 A | 12/2000 | Bruekers et al. ............ 341/143 |
| 6,175,639 B1 | 1/2001 | Satoh et al. ................. 382/100 |
| 6,182,218 B1 | 1/2001 | Saito .......................... 713/176 |
| 6,188,776 B1 | 2/2001 | Covell et al. ............... 382/100 |
| 6,222,932 B1 | 4/2001 | Rao et al. .................... 382/100 |
| 6,229,924 B1 | 5/2001 | Rhoads et al. .............. 382/232 |
| 6,230,151 B1 | 5/2001 | Agrawal et al. .............. 706/12 |
| 6,233,347 B1 | 5/2001 | Chen et al. ................. 382/100 |
| 6,243,695 B1 | 6/2001 | Assaleh et al. ............. 382/100 |
| 6,246,775 B1 | 6/2001 | Nakamura et al. .......... 382/100 |

(Continued)

OTHER PUBLICATIONS

Xiang-Gen Xia, Charles G. Boncelet and Gonzalo R. Arce, "Wavelet Transform Based Watermark for Digital Images," Optics Express, vol. 3, No. 12, Dec. 1998, pp. 497-511.

(Continued)

*Primary Examiner*—Jingge Wu
*Assistant Examiner*—Shefali Patel
(74) *Attorney, Agent, or Firm*—Kilpatrick Stockton LLP

(57) ABSTRACT

Embodiments of the present invention provide digital watermarking methods that embed a digital watermark in both the low and high frequencies of an image or other production, providing a digital watermark that is resistant to a variety of attacks. The digital watermarking methods of the present invention optimize the strength of the embedded digital watermark such that it is as powerful as possible without being perceptible to the human eye. The digital watermarking methods of the present invention do this relatively quickly, in real-time, and in an automated fashion using an intelligent system, such as a neural network. The digital watermarking methods of the present invention may also be used in a variety of new applications, such as the digital watermarking of sensitive aircraft parts and military equipment.

29 Claims, 5 Drawing Sheets

U.S. PATENT DOCUMENTS

| | | |
|---|---|---|
| 6,259,801 B1 | 7/2001 | Wakasu ........................ 382/100 |
| 6,266,430 B1 | 7/2001 | Rhoads ........................ 382/100 |
| 6,278,792 B1 | 8/2001 | Cox et al. .................... 382/100 |
| 6,385,329 B1 * | 5/2002 | Sharma et al. ............... 382/100 |
| 6,714,683 B1 * | 3/2004 | Tian et al. ................... 382/240 |

OTHER PUBLICATIONS

Rakesh Dugad, Krishna Ratakonda and Narendra Ahuja, "A New Wavelet-Based Scheme for Watermarking Images," International Conference on Image Processing, Chicago, Oct. 1998.

Kenneth J. Davis, Kayvan Najarian, E.E. El-Kwae and S. Shirani, "Maximum-strength Wavelet-based Digital Watermarking Using Neural Networks," Proceedings of the 5th World Multi-Conference on Systemics, Cybernetics, and Informatics, Orlando, FL, USA, Jul. 2001.

K.J. Davis and Kayvan Najarian, "Maximizing Strength of Digital Watermarks Using Neural Networks," IEEE © pp. 2893-2898.

J. Liu, Kayvan Najarian and E.E. El-Kwae, "Comparative Evaluation of Wavelet-based Digital Image Watermarking," Proceedings of ICASSP '2001, May 2001. (p. 4029 Abstract Only).

* cited by examiner

AUTOMATED DIGITAL WATERMARKING METHODS USING NEURAL NETWORKS

CROSS-REFERENCE TO RELATED APPLICATIONS

This non-provisional patent application claims the benefit of U.S. Provisional Patent Application No. 60/315,223, entitled "Maximum-Strength Multi-Resolution Watermarking of Digital Products Using Neural Networks," filed Aug. 28, 2001.

FIELD OF THE INVENTION

The present invention relates generally to the field of digital information security. Specifically, the present invention relates to copyright protection for digital products, or digital watermarking. More specifically, the present invention relates to automated digital watermarking methods using neural networks. The methods of the present invention may also be applied to non-digital applications.

BACKGROUND OF THE INVENTION

The explosive growth of globally-distributed computer networks, such as the Internet and broadband networks, the presence of relatively large storage devices and data archives, and the development of efficient compression standards have provided digital image producers and others with a variety of means for distributing their images and other productions. However, these advancements have also made it relatively simple for copyright violators and others to create illegal copies of these images and other productions. As a result, a variety of conventional digital watermarking methods have been proposed. A digital watermark encodes an owner's copyright and/or tracking information and embeds it into an image or other production. Preferably, this digital watermark is invisible to the human eye and may only be perceived by a computer or the like. Digital watermarking methods may be used to identify the owner of an image or other production, to track illegal copies of the image or other production, and to facilitate the licensing of the image or other production. For a digital watermarking method to be successful, the digital watermark must be unobtrusive and must not degrade the perceptual quality of the image or other production. The digital watermark must also be resistant to attacks from a variety of image and signal processing tools and techniques, both unintentional and intentional. Such attacks may include, for example, image compression, smoothing, low-pass filtering, cropping, geometric transformation (including translation, rotation, and scaling), noise addition, printing and scanning, and collusion.

In general, a digital watermark may be applied in either the spatial (pixel) domain or the transform domain. Transform domain digital watermarking methods, such as discrete cosine transform (DCT) and discrete wavelet transform (DWT) digital watermarking methods, typically provide relatively high image fidelity and are resistant to image manipulations. Wavelet-based digital watermarking techniques have multi-resolution hierarchical characteristics that mimic human visual (and audio) perception and allow for the independent processing of the resulting components. With wavelet-based digital watermarking techniques, digital watermark detection may be achieved at relatively low image resolutions, saving computational load. In addition, the high-frequency sub-bands of a wavelet transform include the edges and textures of an image and the human eye is typically insensitive to changes in such sub-bands. This allows digital watermark to be added to the sub-bands without being perceived by the human eye. Wavelets are used in a variety of emerging image and video compression standards, such as JPEG2000 and MPEG4, encouraging the use of wavelet-based digital watermarking. Although embodiments and examples of the present invention deal with transform-based imperceptible digital watermarking methods, the principles and techniques of the present invention are also applicable to spatial (time)-based imperceptible digital watermarking methods as well.

A variety of conventional wavelet-based digital watermarking methods have been proposed. All of these methods are designed to be resistant to a variety of attacks. Typically, these digital watermarking methods insert a digital watermark into the high-frequency contents of an image or other product. Although marginally effective with respect to some types of attacks, the conventional digital watermarking methods are vulnerable to attack if techniques such as low-pass filtering are used. In addition, the conventional digital watermarking methods tend to be labor-intensive, relatively slow, and lack the ability to be adequately automated.

Thus, what is needed is a digital watermarking method that embeds a digital watermark in both the low and high frequencies of an image or other production, providing a digital watermark that is resistant to a variety of attacks. This digital watermarking method should optimize the strength of the embedded digital watermark such that it is as powerful as possible without being perceptible to the human eye. The digital watermarking method should do this relatively quickly, in real-time, and in an automated fashion using an intelligent system, such as a neural network. The watermarking method should also be able to be used in a variety of new applications, such as the watermarking of sensitive aircraft parts, military equipment, and machines.

BRIEF SUMMARY OF THE INVENTION

Embodiments of the present invention provide digital watermarking methods that embed a digital watermark in both the low and high frequencies of an image or other production, providing a digital watermark that is resistant to a variety of attacks. The digital watermarking methods of the present invention optimize the strength of the embedded digital watermark such that it is as powerful as possible without being perceptible to the human eye. The digital watermarking methods of the present invention do this relatively quickly, in real-time, and in an automated fashion using an intelligent system, such as a neural network. The watermarking methods of the present invention may also be used in a variety of new applications, such as the watermarking of sensitive aircraft parts, military equipment, and machines such that the destruction of a watermark associated with a given machine compromises the function of the machine.

In one embodiment of the present invention, a digital watermarking method includes calculating a discrete transform including a plurality of frequency bands and inserting a plurality of digital watermarks into the plurality of frequency bands, wherein each of the plurality of digital watermarks has a predetermined weight.

In another embodiment of the present invention, a computer-readable medium having executable commands operable for digitally watermarking a production includes executable commands operable for calculating a discrete transform including a plurality of frequency bands and inserting a plurality of digital watermarks into the plurality of frequency bands, wherein each of the plurality of digital watermarks has a predetermined weight.

In a further embodiment of the present invention, an automated watermarking method includes creating a database including a first plurality of productions and receiving a first plurality of scores associated with the quality of the first plurality of productions from a plurality of human subjects. The automated watermarking method also includes providing information associated with the first plurality of productions and the first plurality of scores to an intelligent system and training the intelligent system to generate a second plurality of scores associated with the quality of the first plurality of productions, wherein the second plurality of scores is substantially the same as the first plurality of scores. The automated watermarking method further includes providing information associated with a second plurality of productions to the intelligent system, receiving a third plurality of scores associated with the quality of the second plurality of productions from the intelligent system, and optimizing the strength of a watermark using the third plurality of scores.

In a further embodiment of the present invention, a computer-readable medium having executable commands operable for digitally watermarking a production in an automated fashion includes executable commands operable for creating a database including a first plurality of productions and receiving a first plurality of scores associated with the quality of the first plurality of productions from a plurality of human subjects. The executable commands are also operable for providing information associated with the first plurality of productions and the first plurality of scores to an intelligent system and training the intelligent system to generate a second plurality of scores associated with the quality of the first plurality of productions, wherein the second plurality of scores is substantially the same as the first plurality of scores. The executable commands are further operable for providing information associated with a second plurality of productions to the intelligent system, receiving a third plurality of scores associated with the quality of the second plurality of productions from the intelligent system, and optimizing the strength of a digital watermark using the third plurality of scores.

DETAILED DESCRIPTION OF THE INVENTION

In a variety of embodiments and examples, the present invention provides automated methods, systems, and computer-readable media for digital watermarking using neural networks. In the description that follows, specific details are set forth in order to provide a thorough understanding of the present invention. It will be obvious, however, to one of ordinary skill in the art that the methods, systems, and computer-readable media of the present invention may be practiced with or without the inclusion of some or all of these specific details. For example, although the description that follows focuses on using a discrete wavelet transform (DWT) for the space-frequency decomposition of an image or other production, any other suitable frequency transformation may be used, including a discrete Fourier transform (DFT) or a discrete cosine transform (DCT). Likewise, although the description that follows focuses on the digital watermarking of "images," any other suitable production may be digitally watermarked, including audio and video productions. Familiar tools and techniques have not been described in detail in order to avoid obscuring the novel features of the present invention.

A DWT divides a signal into low and high scales (bands). The high-scale component is split again into low and high frequencies. This process is repeated a plurality of times. The original signal may be reconstructed using an inverse discrete wavelet transform (IDWT). The DWT and IDWT are defined for one-dimensional (1-D) and two-dimensional (2-D) signals, such as images. The DWT (or IDWT) for a 2-D image x[m,n] is implemented by applying the 1-D DWT (or IDWT) separately for each dimension, as follows:

$$DWT(x[m,n])=DWT_n[DWT_m(x[m,n])]. \quad (1)$$

Figure 1:
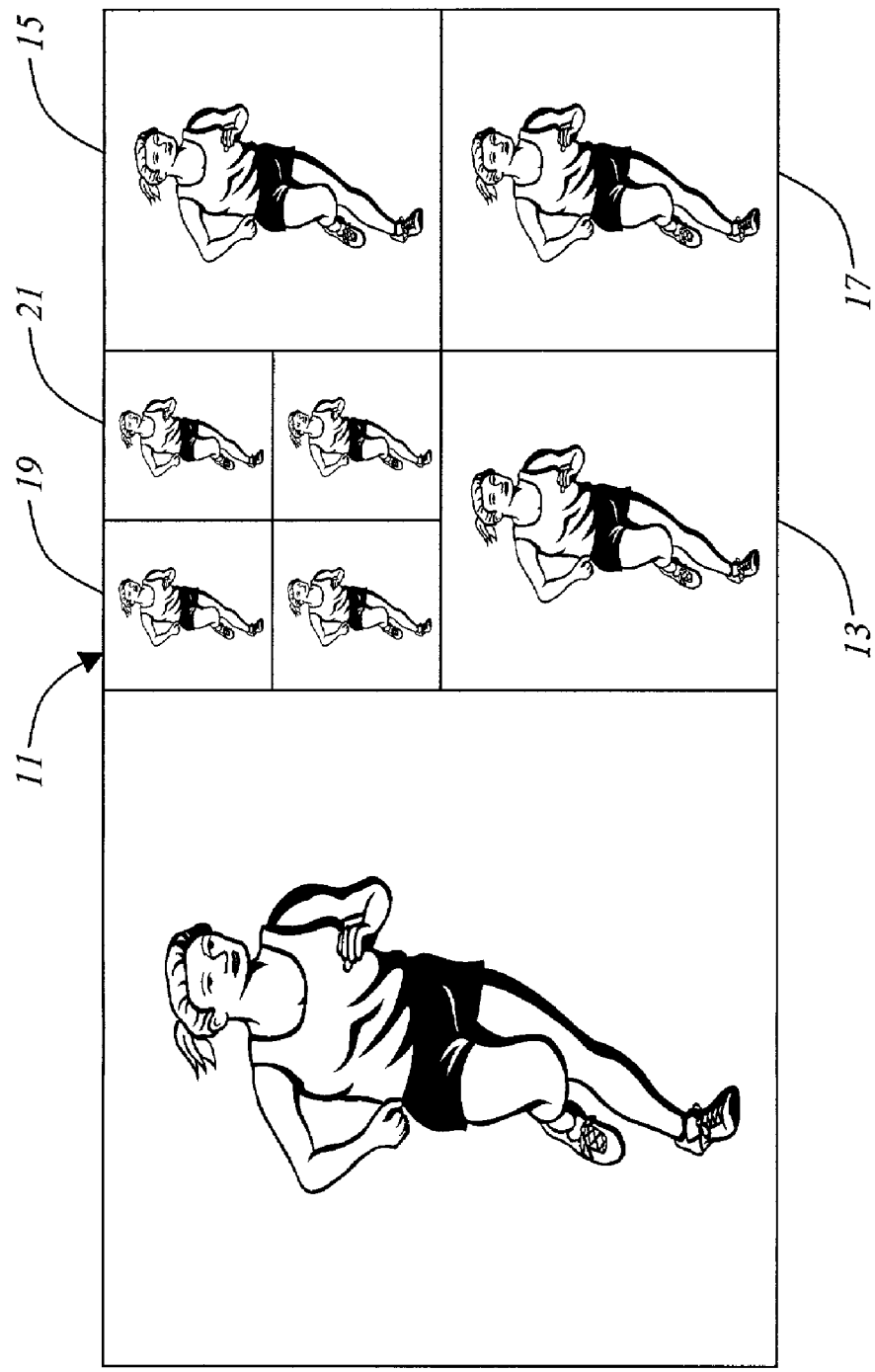
FIG. 1 is a representation of a photograph illustrating the decomposition of an image using an automated digital watermarking method of the present invention.

An image may be decomposed into a pyramid structure with a plurality of bands (such as a low-low band, a high-low band, a low-high band, and a high-high band) using a Mallat pyramid synthesis algorithm. This is illustrated in FIG. 1, which shows the low-low band 11, the high-low band 13, the low-high band 15, and the high-high band 17, and a low-low/low-low band 19, a low-low/low-high band 21, etc. The DWT for a 1-D signal is mathematically stated as follows: Let $H(w)=\Sigma_k h_k e^{-jkw}$ and $G(w)=\Sigma_k g_k e^{-jkw}$ be the low-pass and high-pass filters, respectively. A signal x[n] may be decomposed recursively as:

$$c_{j-1,k}=\Sigma_n h_{n-2k} c_{j,n}, \text{ and} \quad (2)$$

$$d_{j-1,k}=\Sigma_n g_{n-2k} c_{j,n}, \text{ for } j=J+1, J, \ldots, J_0, \quad (3)$$

where $c_{J+1,k}=x[k]$, $k \in Z, J+1$ is the high-resolution level index and $J_0$ is the low-resolution level index. The coefficients $c_{J_0,k}$, $d_{J_0,k}$, $d_{J_0+1,k}$, ..., $d_{J,k}$ are called the DWT of signal x[n], where $c_{J_0,k}$ is the lowest-resolution component of x[n] and $d_{j,k}$ are the details of x[n] at a variety of scales. Furthermore, the signal x[n] may be reconstructed from its DWT coefficients recursively, as follows:

$$c_{j,n}=\Sigma_n h_{n-2k} c_{j-1,k}+\Sigma_n g_{n-2k} d_{j-1,k}. \quad (4)$$

To ensure the DWT and IDWT relationships described above, the following orthogonality condition on H(w) and G(w) is needed: $|H(w)|^2+|G(w)|^2=1$.

A plurality of DWT-based digital watermarking methods have been proposed. For a majority of these methods, a multi-resolution digital watermarking technique is used to add a digital watermark to the high-frequency (low-scale)

bands of the DWT of an image. Because the high-frequency components represent the edges of the image, the digital watermark is not visible to the human eye. Unavoidably, this makes the digital watermark vulnerable to attacks such as low-pass and median filtering. These techniques have been tested using regular attacks, such as wavelet-based image compression, rotation and transformation, low-pass filtering, cropping, additive noise corruption, image rescaling/stretching, and image half-sizing. All of the algorithms described above either add a digital watermark to the low bands (high frequencies) or apply a threshold-based selection to add a digital watermark to significant DWT coefficients.

Referring to the methods of the present invention, given an image, a DWT is calculated and a digital watermark is inserted in all frequencies. The digital watermark is added to every band with a different weight. The insertion is based upon the following equation:

$$c_i' = c_i(1 + \alpha m_i), \quad (5)$$

where $\alpha$ is a scaling parameter, $c_i$ is the coefficient of the original image, $m_i$ is the digital watermark to be added, and $c_i'$ is the watermarked coefficient. It should be noted that $m_i$ follows a normal distribution.

The digital watermark recovery procedure requires the original coefficients where the digital watermark has been added and the digital watermark is extracted from all frequency bands. Digital watermark detection is based upon the following equation:

$$d_i = (c_i' - c_i)/\alpha c_i. \quad (6)$$

The correlation between the extracted numbers and the digital watermarks of each band is then calculated. A relatively high correlation indicates the existence of the digital watermark in a given band. The correlation is calculated as follows:

$$\text{Correlation: } \text{sim}(X, X') = (X'X)/\sqrt{X'X'}, \quad (7)$$

where $$(X'X) = \sum_{i=1}^{n} d_i * m_i.$$

When the correlation calculated above is large, the existence of a digital watermark is detected. Preferably, in order for the methods of the present invention to be more resistant to translation attack, the correlation is calculated for several positive and negative shifts of the digital watermark and a relatively large spike in such a function detects the digital watermark.

Using, for example, a Daubechies 1 (db1) wavelet, a digital watermark length of 1,000 in both the low and high bands, a scaling parameter of 0.01 for the low-frequency bands, and a scaling parameter of 0.1 for the high-frequency bands, no noticeable difference is observed between an original image and a digitally watermarked image. The methods of the present invention were compared with two conventional digital watermarking methods. This comparison indicated that human subjects cannot detect the presence of digital watermarks created using the methods of the present invention.

Tables 1a, 1b, and 1c illustrate the resistance of the three digital watermarking methods to a variety of attacks. Table 1a incorporates the methods of the present invention.

TABLE 1a

Method of the Present Invention (Digital Watermark on Approximation Coefficients: Length = 1,000, Scaling Parameter = 0.01; Digital Watermark on Detail Coefficients: Length = 1,000, Scaling Parameter = 0.1)

| Image | No Degradation | Low-Pass Filter (3 × 3) | Median Filter (3 × 3) | Gaussian Noise | JPEG Quality = 30 | Rotate (Center, 1°) | Translate (2 pixels right) | Half-Sizing |
|---|---|---|---|---|---|---|---|---|
| Teapot | 13.4225 | 2.4924 | 3.6129 | 2.9725 | 4.5604 | 0.9918 | 0.9491 | 3.3602 |
| Peppers | 12.9801 | 2.5339 | 9.2016 | 7.1644 | 6.9962 | 0.6524 | 0.8605 | 7.8442 |
| Woman | 12.5057 | 3.0409 | 8.7305 | 5.7235 | 6.8542 | 0.8516 | 0.5831 | 6.4926 |

TABLE 1b

Conventional Method A (Scaling Parameter = 0.4, Threshold for Adding Digital Watermark = 40, Threshold for Detection = 50)

| Image | No Degradation | Low-Pass Filter (3 × 3) | Median Filter (3 × 3) | Gaussian Noise | JPEG Quality = 30 | Rotate (Center, 1°) | Translate (2 pixels right) | Half-Sizing |
|---|---|---|---|---|---|---|---|---|
| Teapot | 1.8431 | 0.2488 | 0.8301 | 1.6103 | 1.0918 | 0.6551 | 0.2602 | 0.6818 |
| Peppers | 2.8755 | 0.9313 | 1.3323 | 2.5259 | 1.9602 | 0.3849 | 0.7402 | 1.1969 |
| Woman | 2.3295 | 0.6083 | 1.3853 | 2.2077 | 1.0957 | 0.2346 | 0.0223 | 1.5723 |

TABLE 1c

Conventional Method B (Digital Watermark on Detail Coefficients: Length = 500, Scaling Parameter = 0.001)

| Image | No Degradation | Low-Pass Filter (3 × 3) | Median Filter (3 × 3) | Gaussian Noise | JPEG Quality = 30 | Rotate (Center, 1°) | Translate (2 pixels right) | Half-Sizing |
| --- | --- | --- | --- | --- | --- | --- | --- | --- |
| Teapot | 9.1822 | 0.5905 | 0.8798 | 1.1026 | 0.6928 | 0.7331 | 0.5480 | 0.5937 |
| Peppers | 9.6499 | 1.1804 | 1.9448 | 3.6405 | 4.0427 | 0.6871 | 0.6730 | 1.7478 |
| Woman | 9.4054 | 1.0896 | 1.4389 | 2.6512 | 3.8851 | 0.5076 | 0.5891 | 2.8291 |

The value in each cell of Tables 1a, 1b, and 1c is the ratio of the correlation value of the added digital watermark and the maximum correlation value from 300 randomly generated marks. As is illustrated, the digital watermark may be relatively easily detected in the digitally watermarked image (with no degradation) using a correlation test, i.e. the largest peak in the correlation is about 12–14 times larger than the remainder of the peaks, proving the existence of the digital watermark. Tables 1a, 1b, and 1c illustrate that digital watermarks generated using the methods of the present invention are resistant to low-pass filtering, median filtering, JPEG compression (quality=30), and half-sizing. The resistance of the digital watermark to low-pass filtering is expected as a digital watermark added to relatively high frequencies is susceptible to filtering and may be removed relatively easily. The methods of the present invention also provide enhanced resistance to geometric transformations, such as translation and rotation.

Another aspect of a successful digital watermarking method is ensuring that the digital watermark added is optimal. In other words, in order for the digital watermark added to be resistant to different types of attacks, it is necessary to optimize the power of the digital watermark, while still ensuring that the digital watermark is not visible to the human eye. In one embodiment, a method of the present invention defines a neural network-based algorithm that automatically selects and controls digital watermark parameters, creating maximum-strength or optimal digital watermarks. Typically, this process involves generating a digitally watermarked image, allowing one or more persons to judge the image to ensure that the digital watermark is invisible, and repeating the process with increased digital watermark power until just before the digital watermark becomes visible. The method of the present invention replaces the human of the conventional process with an intelligent system, such as a neural network, allowing the process to be automated. The intelligent system may be, for example, a neural network, an expert system, a fuzzy model, or any other suitable system that may learn and mimic the behavior of a complex non-linear system, such as the human visual system (HVS). Neural networks and the like may be trained to accurately and reliably model HVS perception of the quality of digitally watermarked images.

Figure 2:
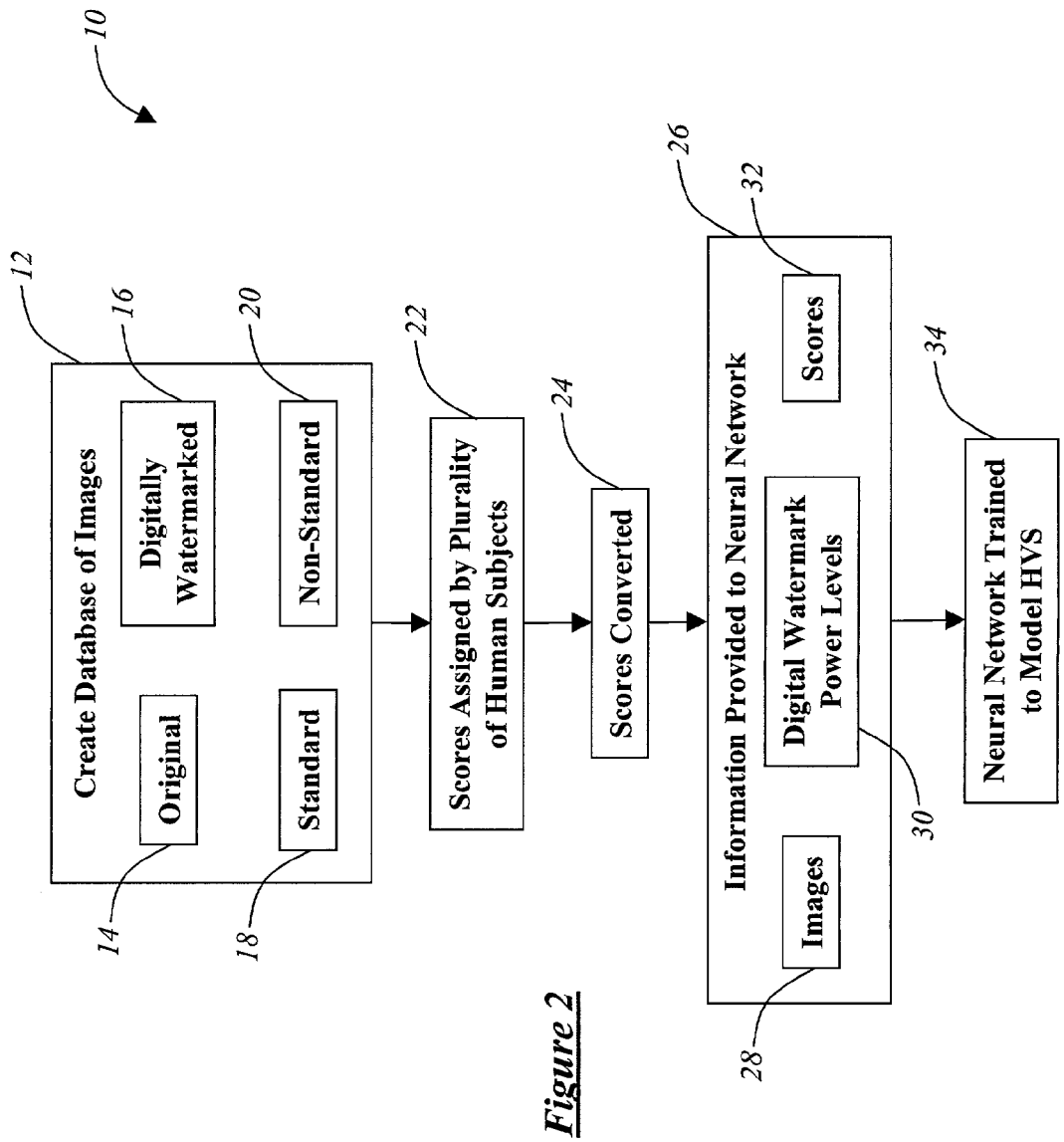
FIG. 2 is a flow chart of one embodiment of the automated digital watermarking method of the present invention, the digital watermarking method using a neural network.

Referring to the method 10 of FIG. 2, to train the neural network, a database of images is created. (Block 12). Preferably, these images include original images 14, digitally watermarked images 16, standard images 18, and non-standard images 20. The images may be digitally watermarked with differing power levels for the wavelet. The quality of the images is then judged by a plurality of human subjects. (Block 22). Specifically, each of the plurality of human subjects assigns a score between 0 and 100 to each of the images. A score of 0 indicates that the there is no perceivable difference between a given original image and the corresponding digitally watermarked image. A score of 100 indicates that a given digital watermark has highly distorted the corresponding original image. Optionally, these scores are then converted to a number between 0 and 1, allowing the use of a logarithmic-based sigmoid activation function for the output layer. (Block 24). The information described above is then provided to the neural network. (Block 26). This information includes the images 28, the power level of the digital watermarks 30, and the scores 32. Using the information, the neural network is trained to approximate a visibility score that a human subject would assign to a given digitally watermarked image. In one embodiment of the present invention, the neural network is a multi-layer sigmoid neural network including a back-propagation training algorithm.

Figure 3:
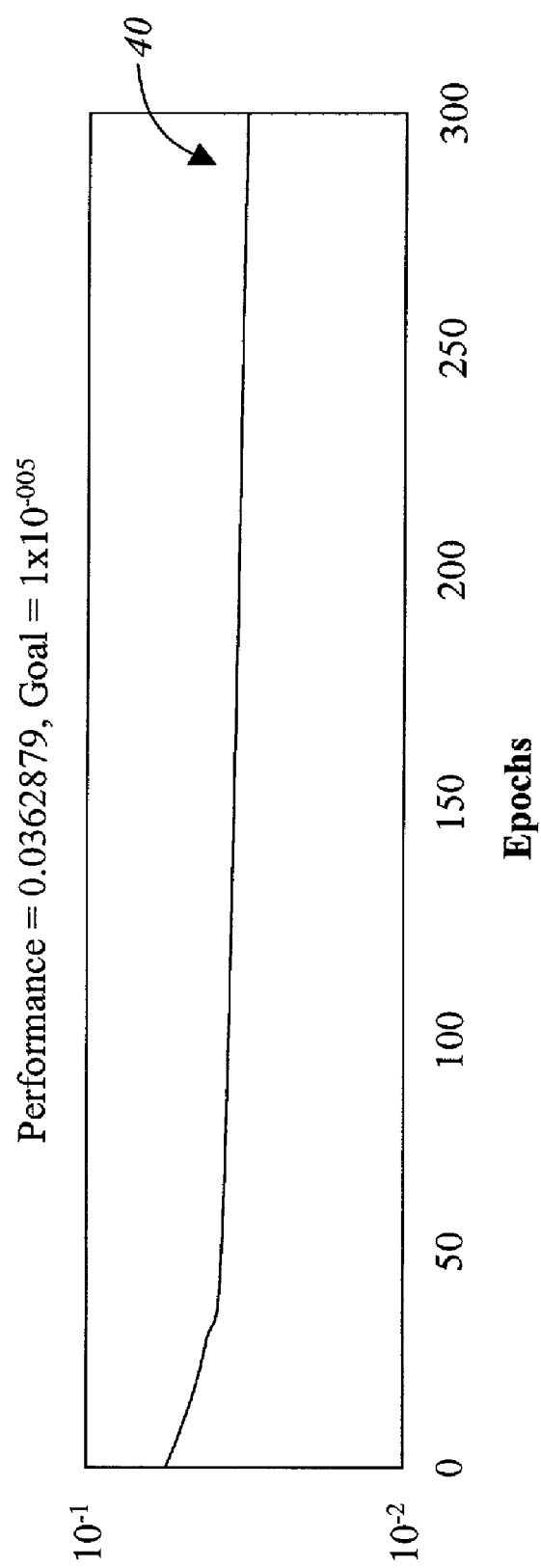
FIG. 3 is a plot of a training curve for the neural network used in accordance with the automated digital watermarking method of the present invention.

FIG. 3 illustrates a training curve 40 for the method described above. After only 300 epochs, the neural network provides a negligible scoring error. Table 2 illustrates the scoring of a different set of digitally watermarked images (a non-training set) with digital watermarks of varying power using the neural network, demonstrating how well the trained neural network approximates the HVS.

TABLE 2

Comparison of Neural network and Human Digital Watermark Visibility Scores (Digital Watermarking Algorithm, Decomposition Level 2, db1, Threshold = 40)

| Test Image (Section) | Digital Watermark Power (α) | NN Digital Watermark Score (scaled by 100) | H Digital Watermark Score |
| --- | --- | --- | --- |
| Woman (1) | 0.4 | 9.7 | 10 |
| Woman (2) | 0.8 | 9.8 | 10 |
| Woman (12) | 0.8 | 27.1 | 25 |
| Woman (13) | 0.4 | 41.4 | 40 |

Figure 4:
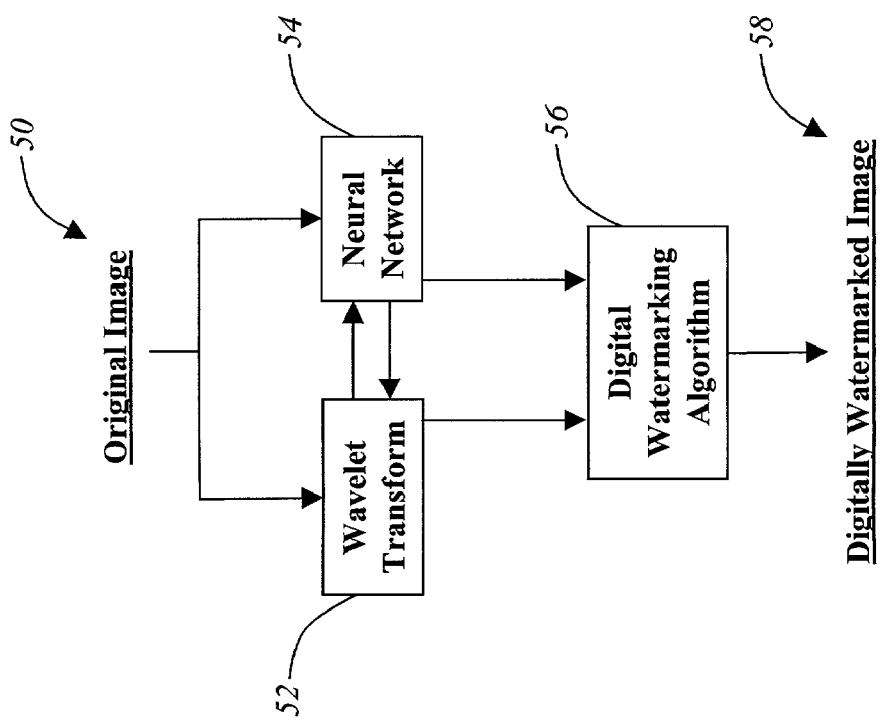
FIG. 4 is a functional block diagram of one embodiment of an automated digital watermarking system of the present invention.

Referring to FIG. 4, in another embodiment of the present invention, after the neural network 54 is trained and tested, an original image 50 may be presented to a wavelet transform 52, the neural network 54, and a watermarking algorithm 56 to produce a digitally watermarked image 58. The neural network 54 is responsible for deeming that the digital watermark has achieved maximum power and yet is still invisible to most humans. It should be noted that the wavelet transform 52 and the neural network 54 may be replaced by any suitable frequency transformation system and expert system, respectively. Preferably, the original image 50 is divided into a plurality of blocks and each of the plurality of blocks is digitally watermarked separately. A comparison of the original blocks and the digitally watermarked blocks reveals that the neural network 54 digitally watermarks the blocks such that the digital watermarks are invisible to the HVS.

Figure 5:
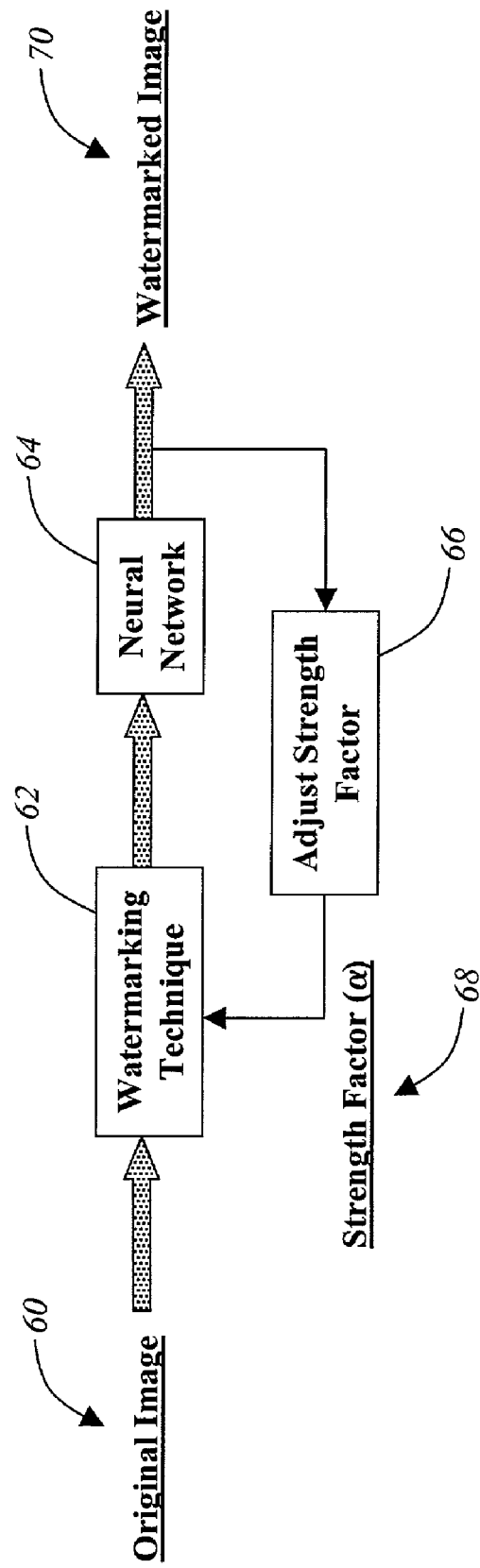
FIG. 5 is a functional block diagram of another embodiment of the automated watermarking system of the present invention.

Referring to FIG. 5, in a further embodiment of the present invention, after the neural network 64 is trained and tested, an original image 60 may be exposed to a watermarking technique 62, the neural network 64, and a strength factor adjustment 66 incorporating a strength factor ($\alpha$) 68 to produce a watermarked image 70. Again, the neural network 64 is responsible for deeming that the watermark has achieved maximum power and yet is still invisible to most humans. It should be noted that the neural network 64 may be replaced by any suitable frequency transformation system and/or expert system. Preferably, the original image 60 is divided into a plurality of blocks and each of the plurality of blocks is watermarked separately. A comparison of the original blocks and the watermarked blocks reveals that the neural network 64 watermarks the blocks such that the watermarks are invisible to the HVS.

It should also be noted that a given type of image (or piece of speech or shot of video) is capable of accepting a predetermined level of digital watermarking, this level varying from one type of image to another. For example, a portrait's capacity to accept a digital watermark is different from that of a landscape scene. Thus, for each type of image, a predetermined type of expert system is trained. During the automated digital watermarking process, the type of image is first recognized, and then an optimized digital watermark is added.

The methods, systems, and computer-readable media of the present invention may be used in conjunction with conventional digital and non-digital watermarking applications. In such cases, the present invention not only automates the watermarking process and creates a means for the real-time implementation of watermarking, but also eliminates the need for and costs associated with human supervision. Likewise, the subjectivity associated with human scoring is eliminated. Potential applications include, for example, copyright protection for images, pictures, videos, multimedia products, and other digital products produced by news agencies and the like; copyright protection for CDs, DVDs, and other digital products produced by entertainment companies and the like; and the protection of biometrics using maximum-strength digital watermarks.

The methods, systems, and computer-readable media of the present invention may also be used where watermarking has not typically been used. Such applications include: 1) the protection and distributional control of medical data, such as MRI, FMRI, CT, and ultrasound images; 2) online and real-time digital watermarking of pictures and videos in the hardware of digital cameras; 3) copyright protection of VLSI chips via the watermarking of the body of the chips; 4) protection against reverse engineering and the unauthorized duplication of vital parts in manufacturing industries such as the automotive, aerospace, and defense industries; and 5) the indexing of negative films of photographs.

It is apparent that there has been provided, in accordance with the present invention, automated digital watermarking methods, systems, and computer-readable media using neural networks. While the present invention has been particularly shown and described in conjunction with examples and preferred embodiments thereof, it will be appreciated that variations in and modifications to the present invention may be effected by persons of ordinary skill in the art without departing from the spirit or scope of the invention. It is to be understood that the principles described herein apply in a similar manner, where applicable, to all such examples and embodiments which the following claims are intended to cover.

What is claimed is:

1. A method, comprising:
creating a database comprising a first plurality of productions;
receiving a first plurality of scores associated with a quality of the first plurality of productions from a plurality of human subjects;
providing information associated with the first plurality of productions and the first plurality of scores to an intelligent system, wherein the intelligent system comprises an intelligent system selected from the group consisting of a neural network, a rough set-based technique, an expert system, and a fuzzy model;
training the intelligent system to generate a second plurality of scores associated with a quality of the first plurality of productions, wherein the second plurality of scores is substantially the same as the first plurality of scores;
providing information associated with a second plurality of productions to the intelligent system;
receiving a third plurality of scores associated with the quality of the second plurality of productions from the intelligent system; and
optimizing by the intelligent system a strength of an imperceptible watermark using the third plurality of scores, wherein an optimized strength comprises a maximum strength of the watermark in which the watermark remains imperceptible.

2. The method of claim 1, wherein the first plurality of productions comprises a plurality of original and a plurality of watermarked productions.

3. The method of claim 1, wherein the first plurality of productions comprises a plurality of standard and a plurality of non-standard productions.

4. The method of claim 1, wherein the second plurality of productions comprises a plurality of watermarked productions.

5. The method of claim 1, wherein the first plurality of scores associated with the quality of the first plurality of productions reflect the degree to which a plurality of watermarks in the first plurality of productions are able to be perceived.

6. The method of claim 1, wherein the second plurality of scores associated with the quality of the first plurality of productions reflect the degree to which a plurality of watermarks in the first plurality of productions are able to be perceived.

7. The method of claim 1, wherein the third plurality of scores associated with the quality of the second plurality of productions reflect the degree to which a plurality of watermarks in the second plurality of productions are able to be perceived.

8. The method of claim 1, wherein the intelligent system comprises an intelligent system operable for learning and mimicking the behavior of a complex non-linear system.

9. The method of claim 1, wherein the first plurality of productions are watermarked with differing power levels for different levels of wavelet decomposition.

10. The method of claim 1, wherein the second plurality of productions are watermarked with differing power levels for different levels of wavelet decomposition.

11. The method of claim 1, wherein optimizing the strength of the imperceptible watermark using the third plurality of scores comprises selecting the maximum strength for the imperceptible watermark.

12. The method of claim 1, wherein the strength comprises a first strength and a second strength, the first strength less than the optimized strength and the second strength greater than the optimized strength, wherein the watermark is imperceptible at the first strength and wherein the watermark is perceivable at the second strength.

13. The method of claim 1, further comprising applying the watermark to a digital application.

14. The method of claim 1, further comprising applying the watermark to an analog application.

15. A computer-readable medium having executable commands operable to watermark a production, the executable commands comprising:
  creating a database comprising a first plurality of productions;
  receiving a first plurality of scores associated with a quality of the first plurality of productions from a plurality of human subjects;
  providing information associated with the first plurality of productions and the first plurality of scores to an intelligent system, wherein the intelligent system comprises an intelligent system selected from the group consisting of a neural network, a rough set-based technique, an expert system, and a fuzzy model;
  training the intelligent system to generate a second plurality of scores associated with a quality of the first plurality of productions, wherein the second plurality of scores is substantially the same as the first plurality of scores;
  providing information associated with a second plurality of productions to the intelligent system;
  receiving a third plurality of scores associated with the quality of the second plurality of productions from the intelligent system; and
  optimizing by the intelligent system a strength of an imperceptible watermark using the third plurality of scores, wherein an optimized strength comprises a maximum strength of the watermark in which the watermark remains imperceptible.

16. The computer-readable medium having executable commands of claim 15, wherein the first plurality of productions comprises a plurality of original and a plurality of watermarked productions.

17. The computer-readable medium having executable commands of claim 15, wherein the first plurality of productions comprises a plurality of standard and a plurality of non-standard productions.

18. The computer-readable medium having executable commands of claim 15, wherein the second plurality of productions comprises a plurality of watermarked productions.

19. The computer-readable medium having executable commands of claim 15, wherein the first plurality of scores associated with the quality of the first plurality of productions reflect the degree to which a plurality of watermarks in the first plurality of productions are able to be perceived.

20. The computer-readable medium having executable commands of claim 15, wherein the second plurality of scores associated with the quality of the first plurality of productions reflect the degree to which a plurality of watermarks in the first plurality of productions are able to be perceived.

21. The computer-readable medium having executable commands of claim 15, wherein the third plurality of scores associated with the quality of the second plurality of productions reflect the degree to which a plurality of watermarks in the second plurality of productions are able to be perceived.

22. The computer-readable medium having executable commands of claim 15, wherein the intelligent system comprises an intelligent system operable for learning and mimicking the behavior of a complex non-linear system.

23. The computer-readable medium having executable commands of claim 22, wherein the complex non-linear system comprises a human visual system.

24. The computer-readable medium having executable commands of claim 15, wherein the first plurality of productions are watermarked with differing power levels for different levels of wavelet decomposition.

25. The computer-readable medium having executable commands of claim 15, wherein the second plurality of productions are watermarked with differing power levels for different levels of wavelet decomposition.

26. The computer-readable medium having executable commands of claim 15, wherein optimizing the strength of the watermark using the third plurality of scores comprises selecting the maximum strength for the watermark.

27. The computer-readable medium having executable commands of claim 15, wherein the strength comprises a first strength and a second strength, the first strength less than the optimized strength and the second strength greater than the optimized strength, wherein the watermark is imperceptible at the first strength and wherein the watermark is perceivable at the second strength.

28. The computer-readable medium having executable commands of claim 15, the executable commands further comprising applying the watermark to a digital application.

29. The computer-readable medium having executable commands of claim 15, the executable commands further comprising applying the watermark to an analog application.

* * * * *

UNITED STATES PATENT AND TRADEMARK OFFICE
CERTIFICATE OF CORRECTION

PATENT NO. : 7,095,872 B2 Page 1 of 1
APPLICATION NO. : 10/134255
DATED : August 22, 2006
INVENTOR(S) : Kayvan Najarian It is certified that error appears in the above-identified patent and that said Letters Patent is hereby corrected as shown below:

Column 7, Line 67 the phrase that reads "that the there" should read --that there--

Signed and Sealed this

Twelfth Day of December, 2006

JON W. DUDAS
*Director of the United States Patent and Trademark Office*